Feb. 8, 1927.
F. M. GUTIERREZ Y LADO
1,616,492
PROCESS FOR MANUFACTURING ICE
Filed May 16, 1925
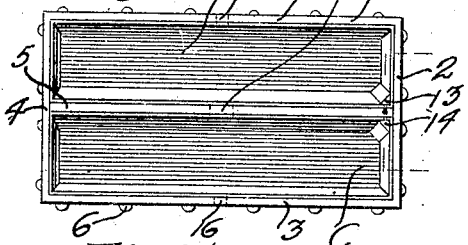
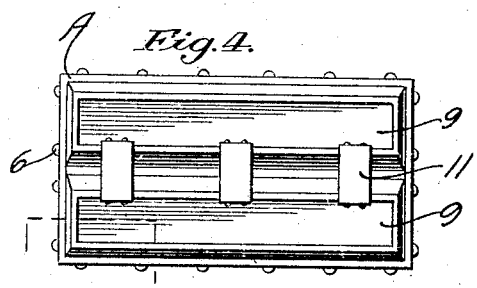
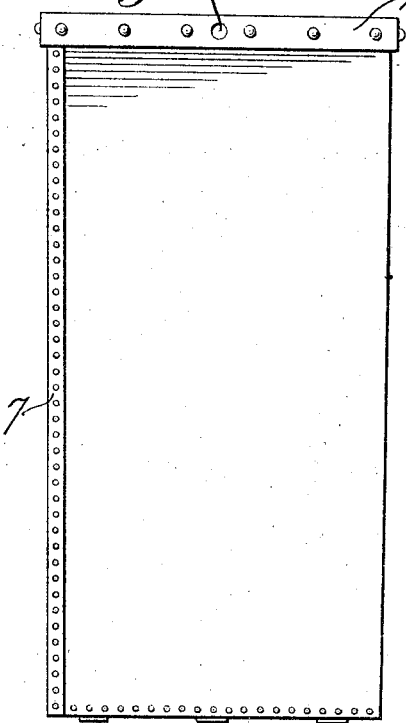
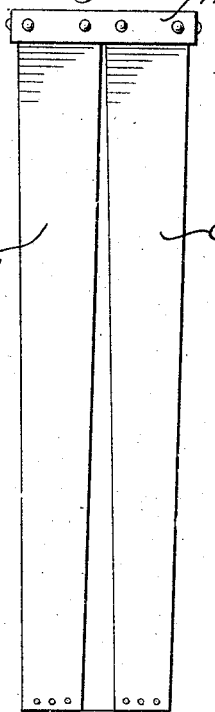
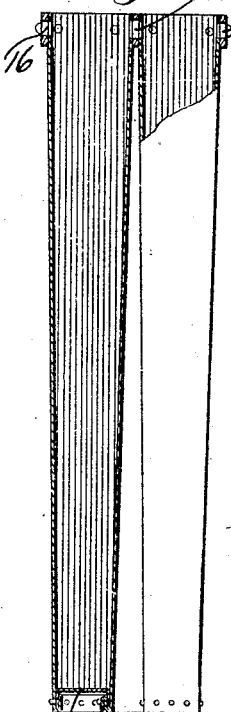
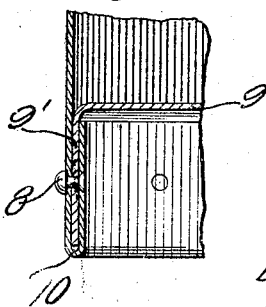
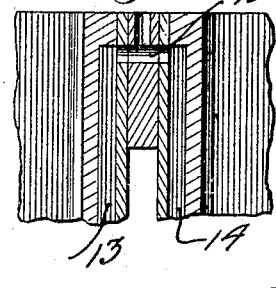
Inventor:
F. M. Gutierrez y Lado
by Langner Parry Card & Langner
Att'ys.

Patented Feb. 8, 1927.

1,616,492

UNITED STATES PATENT OFFICE.

FRANCISCO M. GUTIERREZ Y LADO, OF HABANA, CUBA.

PROCESS FOR MANUFACTURING ICE.

Application filed May 16, 1925, Serial No. 30,825, and in Cuba February 29, 1925.

This invention relates to an improved process and apparatus for manufacturing ice.

One of its objects is to increase the efficiency in freezing ice by decreasing the time necessary for producing a given output without at the same time increasing the operating cost.

Another object is to economize space by producing a mould which will increase the usual production per unit of time and thus decrease the plant space necessary for holding the moulds, for a given plant output.

Another object is to produce a block of ice of given size by successive steps of freezing, a series of blocks a fraction of the size of the desired block being first frozen, and then such series of blocks being frozen together in order to produce the block of desired size.

A further object is to produce a mould having longer life, increased efficiency, and cheaper to produce, than moulds hitherto known.

Further advantages of the improved apparatus and process will appear in the detailed description which follows, taken in connection with the accompanying drawings illustrating one embodiment of the improved mould, and wherein;

Fig. 1 is a top plan view of the mould.

Fig. 2 is a side elevation thereof.

Fig. 3 is an end elevational view of the mould.

Fig. 4 is a bottom plan view of the mould.

Fig. 5 is a transverse vertical cross sectional view, parts being shown in elevation.

Fig. 6 is a section on line 6—6 of Fig. 4, and

Fig. 7 is a section on line 7—7 of Fig. 1.

In the drawings is shown a double frame A having sides, 1, 2, 3 and 4 and a dividing partition 5 which subdivides the frame into two equal parts. To the insides of the two frames thus formed are connected two chamber members B and C having closed lower ends and open upper ends, which latter are connected to the frames by means of rivets 6 or any other desired means. These chambers B and C are in the form of truncated elongated pyramids and taper from the upper end toward the lower end whereby to facilitate removal of the ice blocks which are to be formed in such chambers.

Each of the chamber members B and C is formed of a side portion bent on itself and riveted or otherwise fastened together as shown at 7 in Fig. 2. This connection could equally well of course be effected by welding or the like. To the sides there is connected a bottom member 9 as shown in Fig. 6, said bottom member having a downturned flange 9' receivable in a looped portion 10 of the side member, the bottom and sides being connected by rivets 8 so as to form a tight joint.

The two chambers B and C are interconnected at their lower ends by means of tie members 11 as shown in Fig. 4, an upwardly tapering space being left between the chambers to allow free circulation of freezing mixture and air between such chambers so as to make them in effect separate freezing chambers.

As shown in Fig. 1, small tubes 13 and 14 are fastened into adjacent angles of the two chambers and are interconnected at their upper ends by a passage member 15. These tubes extend downwardly in the chambers and terminate a few inches above the bottoms of the same so as to aerate and thus agitate the water to be contained in the chambers, by forcing air therethrough.

For convenience in moving the moulds, openings 16 and 17 are provided in the members 1 and 3 and member 5, respectively.

The above described mould permits freezing a block of ice of given size in a much shorter time than with an undivided mould of the size of the required block.

To illustrate the new method forming part of this invention, let E be the thickness of a desired block of ice and $e$ be a fractional part of the thickness E. The time for freezing a given thickness of water is well known to be directly proportional to the square of the thickness to be frozen. Thus for example, two thicknesses $e$ could be separately frozen simultaneously in one quarter of the time required to freeze the thickness E, if $e$ is one-half E.

This fact is utilized in applicant's process wherein a series of small blocks of ice which are fractions of the size of a desired block of ice, are simultaneously frozen. The small blocks are then placed together in a tank, preferably with their bases in contact, leaving wedge-shaped spaces between them, which are filled with water and such water is then frozen so as to form a finished block of ice of the desired thickness and size. By using these two separate freezing steps the time for producing a block of ice of given size is very materially reduced, and is proportional to the ratio between the sizes of the small blocks and of the finished block.

By using the apparatus described in this application, two small blocks of ice for example, can be frozen and then such small blocks can be placed together with water filling the intervening spaces and again frozen to produce a finished block.

By proceeding as above, a great economy is effected both in plant space and in operating cost for a given output.

I now claim:—

A process for manufacturing a relatively large block of ice, comprising, forming a plurality of relatively small blocks of ice in the shape of truncated elongated pyramids, then placing the small blocks in a suitable container with their relatively broad bases in contact with each other and resting on the bottom of the container, filling the intervening wedge-shaped spaces between adjacent blocks with water, and freezing such water to interconnect the small blocks.

In testimony whereof I have signed my name to this specification.

FRANCISCO M. GUTIERREZ y LADO.